US012650180B2

(12) United States Patent
Stokke et al.

(10) Patent No.: US 12,650,180 B2
(45) Date of Patent: Jun. 9, 2026

(54) SUBSEA TREE VALVE TESTING

(71) Applicant: EQUINOR ENERGY AS, Stavanger (NO)

(72) Inventors: Ragnar Stokke, Stavanger (NO); Audun Faanes, Trondheim (NO); Henrik Vedeld, Snarøya (NO); Glenn-Roar Halvorsen, Steinsholt (NO)

(73) Assignee: EQUINOR ENERGY AS, Stavanger (NO)

( * ) Notice: Subject to any disclaimer, the term of this patent is extended or adjusted under 35 U.S.C. 154(b) by 356 days.

(21) Appl. No.: 18/574,924

(22) PCT Filed: Jun. 29, 2022

(86) PCT No.: PCT/NO2022/050154
§ 371 (c)(1),
(2) Date: Dec. 28, 2023

(87) PCT Pub. No.: WO2023/277697
PCT Pub. Date: Jan. 5, 2023

(65) Prior Publication Data
US 2024/0318745 A1 Sep. 26, 2024

(30) Foreign Application Priority Data
Jun. 30, 2021 (GB) .................................... 2109479

(51) Int. Cl.
*F16K 37/00* (2006.01)
*E21B 34/04* (2006.01)
*G01M 3/28* (2006.01)
(52) U.S. Cl.
CPC .......... *F16K 37/0091* (2013.01); *E21B 34/04* (2013.01); *G01M 3/2876* (2013.01)

(58) Field of Classification Search
CPC ... E21B 34/04; G01M 3/2876; F16K 37/0091
See application file for complete search history.

(56) References Cited

U.S. PATENT DOCUMENTS

| | | | |
|---|---|---|---|
| 4,337,829 | A | 7/1982 | Banzoli et al. |
| 5,857,523 | A | 1/1999 | Edwards |
| (Continued) | | | |

FOREIGN PATENT DOCUMENTS

| | | |
|---|---|---|
| EP | 2 333 233 | 6/2011 |
| EP | 2 156 016 | 8/2011 |
| (Continued) | | |

OTHER PUBLICATIONS

International Search Report issued Aug. 24, 2022 in International Application No. PCT/NO2022/050154.
(Continued)

*Primary Examiner* — Stephanie E Bloss
*Assistant Examiner* — Diana Hancock
(74) *Attorney, Agent, or Firm* — Wenderoth, Lind & Ponack, L.L.P.

(57) ABSTRACT

There is provided a method for testing a valve of a subsea tree. The method comprises: closing the valve to be tested; fluidly isolating an isolatable region of the subsea tree directly adjacent to the valve to be tested; after being isolated, depressurising the isolatable region to a pressure below an ambient, subsea pressure or pressurising the isolatable region using a pressure manipulation device positioned subsea; monitoring a pressure of the isolatable region after being depressurised; and determining whether the valve to be tested is operating correctly based on the monitoring.

16 Claims, 7 Drawing Sheets

(56) References Cited

U.S. PATENT DOCUMENTS

| | | | | |
|---|---|---|---|---|
| 6,591,201 | B1 | 7/2003 | Hyde | |
| 8,322,427 | B2 | 12/2012 | Inderberg et al. | |
| 9,010,431 | B2 | 4/2015 | Billington et al. | |
| 9,260,940 | B2 | 2/2016 | Howell et al. | |
| 10,012,049 | B2 | 7/2018 | Holmes | |
| 10,161,240 | B1 | 12/2018 | Maresca, Jr. | |
| 10,689,947 | B2 | 6/2020 | Montoya et al. | |
| 10,865,616 | B2 | 12/2020 | Ingram et al. | |
| 2010/0025044 | A1* | 2/2010 | McKay | E21B 33/076 166/359 |
| 2012/0048567 | A1* | 3/2012 | June | E21B 43/013 166/368 |
| 2013/0168101 | A1 | 7/2013 | Bryson et al. | |
| 2013/0311097 | A1 | 11/2013 | Livesay et al. | |
| 2014/0262306 | A1* | 9/2014 | Hosie | E21B 47/001 166/359 |
| 2017/0183956 | A1* | 6/2017 | Taylor | E21B 47/117 |
| 2017/0204717 | A1 | 7/2017 | Fox et al. | |
| 2019/0368300 | A1* | 12/2019 | Maher | E21B 33/064 |
| 2021/0071503 | A1 | 3/2021 | Ogg et al. | |
| 2021/0277746 | A1* | 9/2021 | Jeeves | F16K 37/0091 |

FOREIGN PATENT DOCUMENTS

| | | | | |
|---|---|---|---|---|
| EP | 2 447 798 | 7/2014 | | |
| EP | 2 217 984 | 3/2015 | | |
| EP | 1 853 791 | 8/2018 | | |
| EP | 3 464 811 | 4/2020 | | |
| EP | 3 287 591 | 4/2021 | | |
| EP | 3 833 848 | 6/2021 | | |
| EP | 3 662 134 | 10/2021 | | |
| EP | 3 737 830 | 12/2022 | | |
| EP | 3 495 604 | 5/2023 | | |
| NO | 20121507 | 7/2013 | | |
| NO | 335430 | 12/2014 | | |
| NO | 20150403 | 10/2016 | | |
| NO | 20170508 | 3/2017 | | |
| NO | 20171762 | 11/2017 | | |
| NO | 20200953 | 9/2020 | | |
| NO | 20210344 | 3/2021 | | |
| NO | 345673 | 6/2021 | | |
| NO | 346636 | 11/2022 | | |
| WO | 2006/010765 | 2/2006 | | |
| WO | 2009/154641 | 12/2009 | | |
| WO | 2010/077868 | 7/2010 | | |
| WO | 2010/129478 | 11/2010 | | |
| WO | 2011/041550 | 4/2011 | | |
| WO | 2011/072145 | 6/2011 | | |
| WO | 2012/110289 | 8/2012 | | |
| WO | 2012/110290 | 8/2012 | | |
| WO | 2015/191417 | 12/2015 | | |
| WO | 2015/194968 | 12/2015 | | |
| WO | 2016/161143 | 10/2016 | | |
| WO | 2016/164481 | 10/2016 | | |
| WO | 2016/187511 | 11/2016 | | |
| WO | 2017/042571 | 3/2017 | | |
| WO | WO-2017079630 A1 * | 5/2017 | | E21B 47/00 |
| WO | 2017/127270 | 7/2017 | | |
| WO | 2018/218322 | 12/2018 | | |
| WO | 2021/029776 | 2/2021 | | |
| WO | 2023/208647 | 11/2023 | | |

OTHER PUBLICATIONS

Written Opinion of the International Searching Authority issued Aug. 24, 2022 in International Application No. PCT/NO2022/050154.

Patents Act 1977: Search Report under Section 17 issued Apr. 1, 2022 in corresponding Application No. GB2019479.2.

Master's thesis "NTNU Open Service Line-Less Subsea Production and Injection", Petroleum Technology at the Norwegian University of Science and Technology, 2019, pp. 1-98.

* cited by examiner

SUBSEA TREE VALVE TESTING

The present invention relates to a method of testing a valve of a subsea tree and to a system comprising a subsea tree and a valve testing assembly.

Subsea wells, such as production wells and injection wells, are used in the field of oil and gas production during extraction of hydrocarbon fluids from a reservoir. Subsea wells can also be used in the context of carbon capture and storage (CCS) to facilitate the injection of $CO_2$ into underground formations. Subsea wells are usually provided with a tree (also known as a Christmas tree) which comprises an arrangement of valves and pipes for regulating the flow of fluids into or out of the well. The tree is typically installed at the wellhead of the subsea well.

In conventional systems, a service line fluidly connects the subsea tree to a topside chemical storage system. The purpose of this service line is to supply required chemicals (e.g. MEG) to the subsea well and also to perform all required well integrity testing. The service line is usually provided either as a separate line or integrated as part of a control umbilical.

It is important to regularly test the operation of the valves in the tree to detect any leakages or failures of the valves. Various testing sequences are carried out to sequentially test each valve in the tree. In order to test whether a valve is operating correctly, a pressure differential is created across the valve, typically in the region of 30 to 70 bar, and the valve is examined for fluid leakage.

When testing valves on high-pressure lines, this pressure differential can be generated by bleeding fluid in a pipe downstream of the valve back into the service line, thereby depressurising the downstream side of the valve. However, due to the weight of the fluid within the service line, the minimum pressure of the downstream area achievable with this technique is approximately the ambient pressure (i.e. approximately the pressure of the surrounding sea at the depth of the tree). If this is not sufficient to achieve the required pressure differential, e.g. if the pressure on the upstream side of the valve is too close to the ambient pressure, then it is necessary to artificially increase the pressure of the upstream area, e.g. by injecting chemical from the topside chemical storage system into the tree via the service line.

Pressurising the tree in this manner can be dangerous due to the high pressures required, and may also require injection of large quantities of fluids. In some instances, e.g. when the upstream side of the valve is fluidly connected to the annulus of the well, which is normally at relatively low pressure, testing of the valve can require artificially increasing the pressure within the entire annulus which further increases the risks involved.

It is desired to provide a method and system for testing the valves of a subsea tree that is safe and relatively simple to perform.

Viewed from a first aspect, the present invention provides a method for testing a valve of a subsea tree, the subsea tree being arranged to control the flow of fluid into or out of a subsea well, the method comprising: closing the valve to be tested; fluidly isolating an isolatable region of the subsea tree directly adjacent to the valve to be tested; after being isolated, depressurising the isolatable region to a pressure below an ambient, subsea pressure or pressurising the isolatable region using a pressure manipulation device positioned subsea; monitoring a pressure of the isolatable region after being depressurised or pressurised; and determining whether the valve to be tested is operating correctly based on the monitoring.

Since the pressure manipulation device is positioned subsea, rather than located topside, it may no longer be necessary to provide a service line that connects the subsea tree to a topside system since the pressure manipulation device is located subsea.

Moreover, the minimum pressure achievable in the isolatable region is not limited by the weight of fluid in the service line. Thus, in some embodiments the isolatable region can be depressurised to below ambient pressure. As a result, the system can achieve a target pressure differential across the valve to be tested without needing to first pressurise one side of the valve, even when the pressure on that side is relatively low. The dangers associated with creating artificially high pressures in the system are thereby minimised. Thus, the present method may provide improved safety over existing systems.

The invention also extends to a related system. Thus, viewed from a second aspect, the present invention provides a system comprising: a subsea tree for controlling the flow of fluid into or out of a subsea well, the subsea tree comprising a valve to be tested, wherein the system is configured such that an isolatable region of the subsea tree directly adjacent to the valve to be tested can be fluidly isolated during a valve testing operation; a pressure manipulation device positioned subsea and connected to the subsea tree such that the pressure manipulation device can depressurise fluid within the isolatable region to a pressure below an ambient, subsea pressure or pressurise fluid within the isolatable region during a valve testing operation; and a sensing device arranged to measure a pressure of the isolatable region for determining correct operation of the valve to be tested.

The method of the first aspect may be performed using the system of the second aspect. The system of the second aspect may comprise a controller configured to operate the system using the method of the first aspect.

The system and the method may further comprise any of the features described herein.

The subsea tree may be for controlling the flow of fluids into or out of any suitable subsea well, such as a hydrocarbon fluid production well (e.g. an oil production well or a gas production well), a liquid injection well (e.g. a water injection well or liquid $CO_2$ injection well), a gas injection well (e.g. a $CO_2$ injection well), etc. Injection wells can be used for injecting gas or liquid during oil/gas production, or alternatively for gaseous or liquid $CO_2$ injection in the case of CCS. The subsea tree may be mounted to a wellhead of the subsea well.

The subsea tree preferably comprises one or more other valves in addition to the valve to be tested. The valve to be tested and/or any of the one or more other valves may comprise one of: a gate valve, an annulus master valve (AMV), an annulus isolation valve (AIV), an annulus swab valve (ASV), an annulus wing valve (AWV), an annulus vent valve (AVV), a gas injection valve (GIV), a production master valve (PMV), a production swab valve (PSV), a production wing valve (PWV), a surface-controlled subsea surface safety valve (SCSSV; also referred to as a down hole safety valve), a service injection valve (SIV), etc. The flow of fluids entering the well (e.g. water or gas for injection) or exiting the well (e.g. produced hydrocarbons) during normal operation of the well is preferably controlled by operation of one or more of the valves which open and close fluid flow paths within the subsea tree.

The isolatable region being directly adjacent to the valve to be tested preferably means that there are no other components located between the isolatable region and the valve to be tested, i.e. such that the valve to be tested itself forms a boundary of the isolatable region. The isolatable region may further comprise one or more other valves of the subsea tree in addition to the valve to be tested, as well as one or more sections of pipeline which interconnect between said valves. The one or more sections of pipeline may include sections of a production line, an annulus line, a chemical injection line, a water or gas injection line, etc. The isolatable region of the subsea tree may be fluidly isolated by closing the valves that bound the isolatable region (in addition to the closing of the valve to be tested), thereby sealing the interconnecting pipelines. Thus, any fluid within the isolatable region after the isolating has been performed is contained to the isolatable region until the depressurising or pressurising is performed.

In embodiments where the isolatable region is depressurised, the isolatable region of the tree is preferably a region directly downstream of the valve to be tested, since valves are normally tested such that the higher pressure is on the upstream side of the valve and the lower pressure is on the downstream side of the valve, as this most closely corresponds to their normal operating conditions. However, the isolatable region may alternatively be the region directly upstream of the valve.

In embodiments where the isolatable region is pressurised, the isolatable region of the tree is preferably a region directly upstream of the valve to be tested. However, the isolatable region may alternatively be the region directly downstream of the valve.

The terms 'downstream' and 'upstream' refer to the direction of the flow of fluids through the subsea tree in normal operation of the subsea tree, e.g. while the well is producing or while injection is occurring.

A sensing device, e.g. a pressure sensor, is arranged to measure the pressure of the isolatable region. The system may comprise further pressure sensors arranged to monitor the pressure of other regions of the system, e.g. the annular cross, the production cross, the annulus, etc. Signals from one or more of the pressure sensors can be used to determine the pressure differential across the valve to be tested. The pressure differential is the difference between the pressure on the upstream side of the valve and the downstream side of the valve, and may be referred to as a "delta pressure".

The isolatable region is preferably depressurised or pressurised using the pressure manipulation device such that a desired or target pressure differential across the valve to be tested is achieved. The target pressure differential may be determined based on e.g. the specifications of the valve or regulations that the valve is required to meet. The target pressure differential may be at least 10 bar, and preferably at least 20 bar. In a preferred embodiment, the target pressure differential is within the range of 30 to 70 bar. The signals from the pressure sensor(s) may be used to control the pressure manipulation device, e.g. by stopping the pressure manipulation device once the target pressure differential has been reached.

The pressure manipulation device may be any suitable device which is capable of deployment subsea and may be configured to depressurise the isolatable region of the tree to a pressure below ambient, subsea pressure and/or to pressurise the isolatable region of the tree during the valve testing operation. The ambient pressure is the pressure of the surrounding sea at the depth of the subsea tree (e.g. at 1000 m below sea level, the ambient pressure may be approx. 100 bar(g)).

The pressure manipulation device may be able to perform both pressurising and depressurising as described herein.

In some embodiments the pressure manipulation device may comprise a controllable volume, e.g. a chamber whose volume can be increased and decreased in a controlled manner. The controllable volume is preferably in fluid communication with the isolatable region via a conduit, e.g. a service line. A fluid flow path defined by the conduit may be opened and closed by operation of one or more valves, e.g. a service line valve. Thus, when the service line valve is opened, the fluid in the isolatable region can flow through the conduit into the controllable volume. The volume of the controllable volume can then be adjusted, e.g. using a suitable controller and/or actuator, until the desired pressure or pressure differential is reached. Thus, depressurising the isolated region may comprise opening a service line valve and expanding the volume of the controllable volume. Conversely, pressurising the isolated region may comprise opening a service line valve and contracting the volume of the controllable volume. Thus, the same controllable volume could be used to both pressurise and depressurise the isolatable region as required to achieve the valve testing pressure differential.

In other embodiments, the pressure manipulation device may comprise other means for depressurising or pressurising the isolatable region, such as a pump or the like.

The pressure manipulation device may optionally comprise a heater. Applying heating in the pressure manipulation device can prevent the formation of hydrates, which can be an issue in both production wells and injection wells (including $CO_2$ injection wells).

The pressure manipulation device is preferably located proximate to the subsea tree, e.g. within about 20 m, within about 10 m, within about 5 m, or within 2 m of the subsea tree. In some embodiments, the pressure manipulation device may be mounted on or integrated with the subsea tree. This allows the interconnecting conduit between the pressure manipulation device and the subsea tree to be relatively short, improving the ease with which the pressure of the isolatable region can be manipulated since the volume of fluid being manipulated is relatively low (i.e. compared to a long conduit). The pressure manipulation device is preferably located at or around the same subsea depth as the subsea tree, so that the weight of the fluid within the interconnecting conduit does not overly limit the minimum pressure achievable in the isolatable region by the pressure manipulation device. For example, the pressure manipulation device may be located at a depth less than 20 m above and/or below, preferably less than 10 m above and/or below, and more preferably less than 5 m above and/or below, a depth of the valve to be tested.

The pressure manipulation device may be driven (e.g. controlled or actuated) by a suitable driving unit, such as a hydraulic power unit or an electric actuator. The driving unit is preferably also located subsea. The driving unit may be configured to adjust the volume of the controllable volume of the pressure manipulation device to thereby control the pressure of the isolatable region during the valve testing operation. The driving unit may for instance control the position of a wall of the controllable volume, wherein the position of the wall affects the size of the controllable volume. The driving unit may change the position of the wall by hydraulic operation, motorised movement, or any other suitable technique.

In a preferred embodiment the pressure manipulation device comprises a hydraulic piston driven using a subsea hydraulic power unit. The hydraulic piston preferably comprises a working chamber and at least one driving chamber connected by a piston rod. A wall of the working chamber may be formed by an end of the piston rod. The working chamber may be fluidly connected to the isolatable region of the subsea tree via a service line. The working chamber and the driving chamber may be configured such that as the piston rod moves in a first direction, the volume of the working chamber is increased and the volume of the driving chamber is decreased, and vice versa.

In such embodiments, the position of the piston rod (and hence the volume of the working chamber) may be controlled using a hydraulic circuit of the subsea power unit. The hydraulic circuit may be fluidly connectable to the driving chamber and may be configured such that hydraulic fluid can be injected into or drawn out of the driving chamber to cause the piston rod to move accordingly. The subsea hydraulic power unit preferably comprises a pump configured for this purpose. The pump may be connected to the driving chamber via a directional control valve (DCV) which is configured to permit fluid flow through two or more different paths. The DCV may be switchable between multiple positions to cause fluid to be pumped into or out of the driving chamber as required, to thereby drive the piston rod in a first direction or a second direction (i.e. to expand or contract the working chamber). The hydraulic circuit may comprise one or more hydraulic accumulators, such as a high-pressure accumulator and/or a low-pressure accumulator, to temporarily store hydraulic fluid and return the fluid into the circuit when it is needed.

In alternative embodiments, the pressure manipulation device may comprise a piston driven using an electric actuator. The piston may comprise a working chamber whose volume is adjustable by actuation of a piston rod, wherein the piston rod is controlled by the electric actuator. The working chamber may be fluidly connected to the isolatable region of the subsea tree via a service line. The electric actuator may comprise a rotating element, the rotational movement of which may be converted to linear movement of the piston rod, e.g. using a ball screw. Electric actuators are advantageous because they can have variable speed and stop at an exact location, thus achieving precise control of the pressure of the isolatable region, and they are typically less expensive than hydraulic actuators.

Embodiments comprising a hydraulic piston and a subsea hydraulic power unit may be preferred when the subsea well is a production well, since more force from the driving unit is required. However, an electric actuator may be able to provide the sufficient force for a production well, and so an electric actuator can be used in this context to provide more accurate position control and reduced costs. Embodiments comprising a piston and an electric unit may be preferred when the subsea well is an injection well, since less force from the driving unit is required and so more simple electric actuators are sufficient for pressure manipulation.

The pressure manipulation device may comprise a fluid accumulation device, such as an accumulator, which may be configured to receive and temporarily store fluid from a chamber of the pressure manipulation device. The accumulator can help to create a rapid delta pressure over the valve to be tested in order to achieve a good seal, which is important during pressure tests of the valve. The accumulator may be sufficiently well insulated to prevent the formation of hydrates or wax when the fluid contained therein is a hydrocarbon fluid. The accumulator and/or the controllable volume may also be heated for this purpose, as mentioned previously.

The volume of the controllable volume, e.g. the position of the piston rod, may be controlled using a suitable controller. The controller may be configured to control the volume of the controllable volume until the target pressure differential has been reached. The controller may receive signals from one or more pressure sensors in the system, particularly a pressure sensor monitoring the pressure in the isolatable region and/or in the controllable volume, so that the controller can determine when the target pressure differential has been reached.

In some embodiments, the upstream side of the valve to be tested may be fluidly connected to an annulus of the well during the valve testing operation. The pressure directly upstream of the valve during the testing operation may therefore be the pressure of the annulus. In such embodiments the testing operation may be performed while the well is producing. The advantages of the described method can be particularly recognised in these embodiments because the annulus pressure has a tendency to decrease over the lifetime of the well. Thus, as the annulus pressure decreases near the end of the lifetime of the well, the pressure differential between the annulus pressure and the ambient pressure may be insufficient for well valve testing purposes (e.g. the differential may be less than the minimum target pressure differential). In such circumstances, conventional systems will require pressurising the annulus first, which has safety risks as mentioned previously. According to the described method, instead of artificially raising the annulus pressure, the downstream pressure can be lowered to below ambient pressure using the pressure manipulation device. Thus, the target pressure differential for valve testing can still be achieved without the need to raise the annulus pressure.

After the target pressure differential has been achieved, the isolatable region may be fluidly isolated again, e.g. by closing the fluid connection between the isolatable region and the pressure manipulation device which had been opened during the depressurisation or pressurisation step.

The monitoring of the pressure of the isolatable region after depressurisation or pressurisation may be performed for a predetermined period of time (e.g. 10 minutes). If the valve to be tested is operating correctly and there are no leakages, then there should be no or little change in the pressure of the isolatable region during this time. If the valve to be tested is faulty, then some fluid from the relatively pressurised side of the valve may leak into the relatively low pressure side, thereby altering the pressure of the isolatable region. This would also cause the pressure differential to decrease as the pressures on either side of the valve equalise. Thus, if the isolatable region was depressurised, then an increase in pressure in the isolatable region and/or a decrease in the pressure differential across the valve to be tested during the predetermined time period may be indicative of a leakage of the valve, i.e. that the valve that is not operating correctly. Similarly, if the isolatable region was pressurised, then a decrease in pressure in the isolatable region and/or a decrease in the pressure differential across the valve to be tested during the predetermined time period may be indicative of a leakage of the valve.

Although it may be preferred for no fluid to leak across the valve to be tested during the testing operation, there may be some acceptable leakage rate of fluid across the valve. Thus, the valve to be tested may be determined to be operating incorrectly if the pressure of the isolatable region during the monitoring increases or decreases at a rate above a predetermined threshold. Similarly, the valve to be tested may be determined to be operating correctly if the pressure of the isolatable region during the monitoring increases or decreases at a rate below the predetermined threshold. The predetermined threshold may correspond to an acceptable leakage rate and may be determined according to the specific parameters of the subsea tree and subsea well.

The conduit connecting the pressure manipulation device and the subsea tree may be flushed after the valve testing sequence to prepare the system for normal use or for further valve testing sequences for other valves of the subsea tree. Flushing the conduit may include pumping a chemical from a chemical storage system or from a service line connected to topside through the conduit. The chemical for flushing may comprise MEG, methanol, water etc. depending on the type of subsea well associated with the system. The chemical storage system is preferably also located subsea to avoid the need for a chemical supply line connecting the subsea tree to a topside chemical storage system. The system may therefore comprise a subsea chemical storage system fluidly connected to the conduit and may further comprise a pump for pumping chemical from the subsea chemical storage system through the conduit.

Multiple valve testing sequences may be performed sequentially to test various valves of the subsea tree. Some testing sequences may test multiple valves simultaneously, e.g. by testing the annular cross or the production cross. In such cases, if a leak is detected, further operations may be required to identify which valve of the multiple valves being tested is leaking.

As mentioned above, subsea wells can also be used for carbon capture and storage by facilitating the injection of $CO_2$ into underground formations. Such subsea wells typically also use a valve tree for fluid (i.e. $CO_2$) regulation. The subsea tree valve testing method and system of the present invention can therefore be applied in this context as well.

The $CO_2$ may be injected in liquid or gaseous form. For liquid $CO_2$ injection, in the valve tree if the pressure of the $CO_2$ becomes too low then the $CO_2$ may undesirably change from a liquid phase to a mixed liquid and gas phase. Therefore, in these embodiments the pressure manipulation device may preferably be configured to depressurise the isolatable region to a minimum pressure that is above 45 bar absolute, so that the liquid $CO_2$ does not change phase.

Certain preferred embodiments of the present invention will now be described, by way of example only, with reference to the following drawings, in which.

Figure 1:
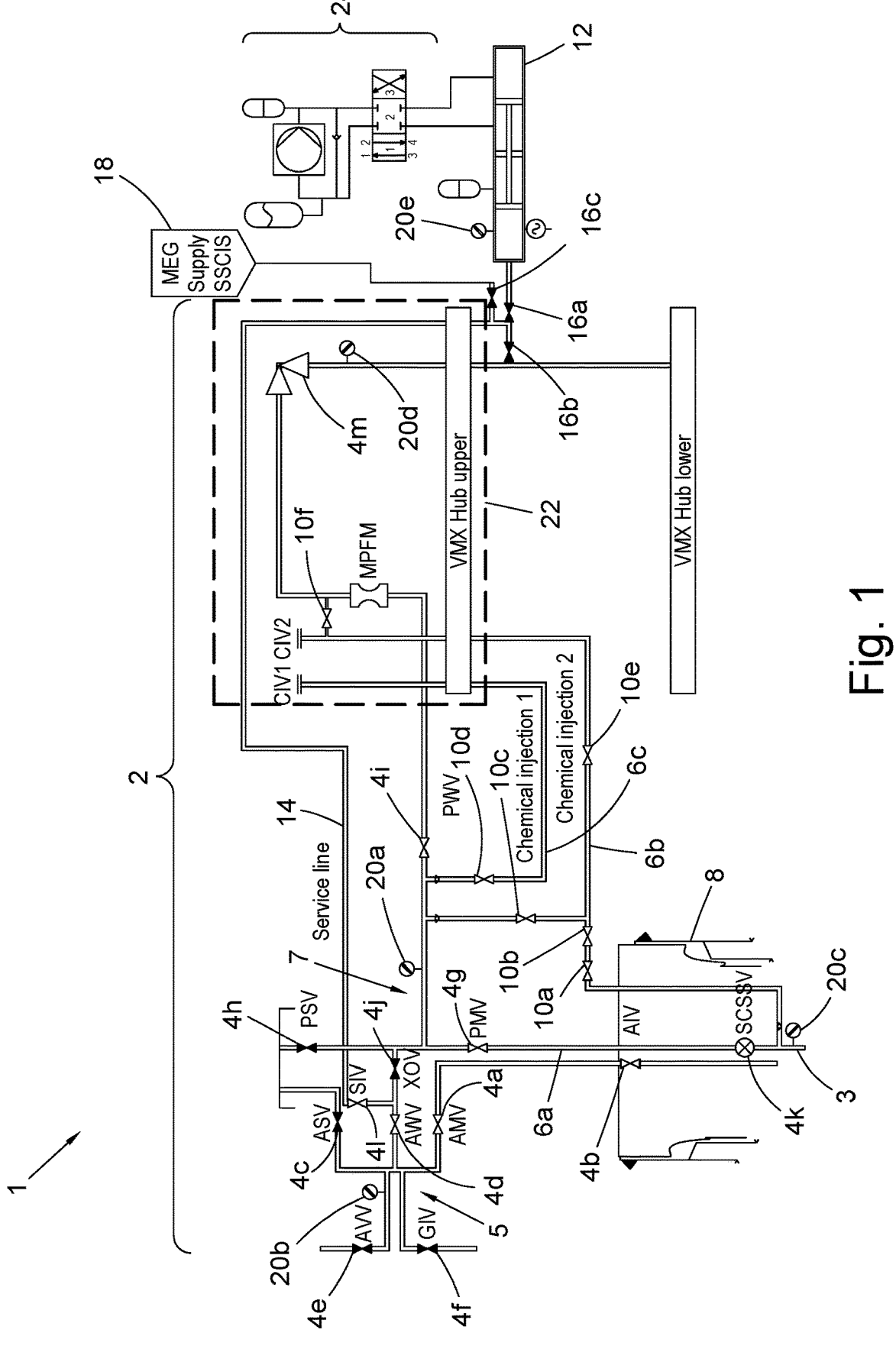
FIG. 1 shows a schematic diagram of a system according to a first embodiment.

A schematic diagram of a system 1 according to a first embodiment is shown in FIG. 1. The system 1 comprises a subsea tree 2 including a plurality of valves 4a-4m and pipelines 6a-6c which control the flow of fluid into and out of a subsea production well. The subsea tree 2 connects to a production tubing 3 which extends into the subsea production well. The valves 4a-4m include an annulus master valve (AMV) 4a, an annulus isolation valve (AIV) 4b, an annulus swab valve (ASV) 4c, an annulus wing valve (AWV) 4d, an annulus vent valve (AVV) 4e, a gas injection valve (GIV) 4f, a production master valve (PMV) 4g, a production swab valve (PSV) 4h, a production wing valve (PWV) 4i, a cross-over valve (XOV) 4j, a surface-controlled subsea safety valve (SCSSV) 4k, a service injection valve (SIV) 4l, and a production choke valve (PCV) 4m. Chemical injection lines 6b, 6c are configured for injecting chemicals into a production pipeline 6a via operation of valves 10a-10f. The subsea tree 2 is fluidly connected to an annulus 8 of the subsea well and the production tubing 3. A flow control module 22, represented by a dashed line, controls the flow of fluids. A multiphase flow meter (MPFM) measures the flow of fluids in the flow control module 22.

The region of the subsea tree 2 defined by the GIV 4f, the AVV 4e, the ASV 4c, the SIV 4l, the XOV 4j and the AMV 4a (and interconnecting pipelines) is referred to as the annular cross 5. The region of the subsea tree 2 defined by the PSV 4h, the PMV 4g, the XOV 4j, the PWV 4i and valves 10c and 10d (and interconnecting pipelines) is referred to as the production cross 7.

The system 1 further comprises a hydraulic piston 12 for manipulating the pressure of regions of the subsea tree 2. The hydraulic piston 12 is fluidly connected to the subsea tree 2 via a service line 14. A first service line valve 16a is configured to control the flow of fluid between the service line 14 and the hydraulic piston 12, and the SIV 4l and a second service line valve 16b are configured to control the flow of fluid between the service line 14 and the subsea tree 2. The service line 14 is also fluidly connected to a chemical storage system 18, with the flow of fluid to and from the chemical storage system 18 being controllable via a third service line valve 16c. The chemical storage system 18 comprises a pump (not shown).

A plurality of pressure sensors 20a-20e are located throughout the system 1. A first pressure sensor 20a is arranged to measure the pressure in the production cross 7. A second pressure sensor 20b is arranged to measure the pressure of the annular cross 5. A third pressure sensor 20c is arranged to measure the pressure of the production tubing upstream of the SCSSV 4k. A fourth pressure sensor 20d is arranged to measure the pressure of the flow control module 22. A fifth pressure sensor 20e is arranged to measure the pressure in the hydraulic piston 12.

The system 1 further comprises a subsea hydraulic power unit 24 configured to drive the hydraulic piston 12.

Figure 2:
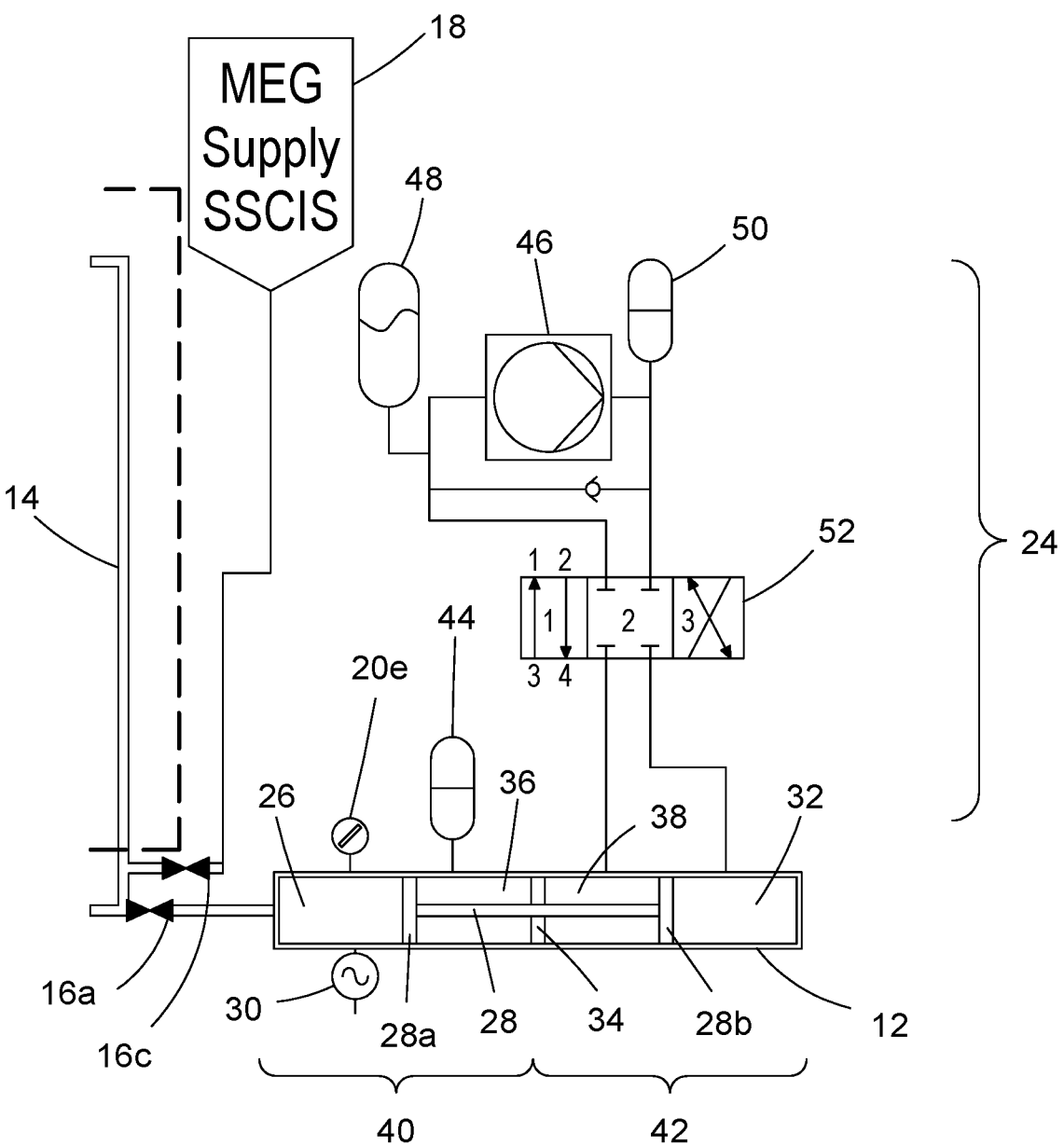
FIG. 2 shows a close view of the pressure manipulation device of the system of FIG. 1.

The structure of the hydraulic piston 12 and the subsea hydraulic power unit 24 can be seen more clearly in FIG. 2.

The hydraulic piston 12 comprises a working chamber 26. A wall of the working chamber 26 is defined by a first end 28a of a piston rod 28. Actuation of the piston rod 28 in a linear direction alters the position of the first end 28a, thereby adjusting the volume of the working chamber 26. The working chamber 26 is fluidly connected to the service line 14 and comprises the pressure sensor 20e and a heater 30. The heater 30 is for preventing the formation of hydrates and/or wax in the working chamber 26 of the hydraulic piston 12, since the working chamber 26 is exposed to the produced fluid.

The hydraulic piston 12 further comprises two driving chambers 32, 38. A wall between the first driving chamber 32 and the second driving chamber 38 is defined by a second end 28b of the piston rod 28. Actuation of the piston rod 28 in a linear direction alters the position of the second end 28b, thereby adjusting the volume of the driving chambers 32, 38.

A neutral chamber 36 is defined between a partition 34 and the first end 28a of the piston rod 28. The working chamber 26 and the neutral chamber 36 are collectively referred to as a working cylinder 40. Similarly, the first driving chamber 32 and the second driving chamber 38 are collectively referred to as a driving cylinder 42. The working cylinder 40 and the driving cylinder 42 are fluidly isolated from each other by the partition 34 through which the piston rod 28 extends. The heater 30 may be configured for heating the working cylinder 40 (i.e. the neutral chamber 36 as well as the working chamber 26). The driving cylinder 42 may not require heating since it contains hydraulic fluid, rather than production fluid, and thus is not at risk of hydrate formation.

The hydraulic piston 12 comprises an accumulator 44 fluidly connected to the neutral chamber 36. Thus, as the piston rod 28 moves to the right, fluid in the first central chamber 36 enters and is stored within the accumulator 44, and as the piston rod 28 moves to the left, fluid exits the accumulator 44 and enters the first central chamber 36. While movements of the piston rod are herein described as 'left' and 'right', it will be appreciated that these terms are relative and are simply convenient labels to describe opposing linear directions of movement of the piston rod 28.

The subsea hydraulic power unit 24 is configured to drive the piston rod 28 and comprises a pump 46, a low-pressure accumulator 48 upstream of the pump 46, and a high-pressure accumulator 50 downstream of the pump 46. The pump 46 is operated to maintain a pressure differential between an upstream (low-pressure) side of the pump 46 and the downstream (high-pressure) side of the pump 46. A directional control valve (DCV) 52 is disposed between the driving cylinder 42 and the pump 46, and controls the fluid connection therebetween.

The DCV 52 has three different positions or configurations. In a first position of the DCV 52, the second driving chamber 38 is connected to the low-pressure side of the pump 46, and the first driving chamber 32 is connected to the high-pressure side of the pump 46. Thus, the piston 28 will move to the left, decreasing the volume of the working chamber 26. In a second position of the DCV 52, the driving cylinder 42 is not in fluid communication with either accumulator 48, 50 of the hydraulic power unit 24. Thus, the volume of the working chamber 26 remains constant. In a third position of the DCV 52, the second driving chamber 38 is connected to the high-pressure side of the pump 46, and the first driving chamber 32 is connected to the low-pressure side of the pump 46. Thus, the piston 28 will move to the right and the volume of the working chamber 26 will increase.

The hydraulic power unit 24 is therefore configured to drive the piston rod 28 to the right or the left by pumping fluid either into the first driving chamber 32 or the second driving chamber 38, depending on the configuration of the DCV 52. When the piston rod 28 is actuated in the left direction, fluid in the working chamber 26 is forced out of the hydraulic piston 12 and into the service line 14 (if the first service line valve 16a is open). Conversely, when the piston rod 28 is actuated in the right direction, fluid is drawn into the working chamber 26 from the service line 14 (if the first service line valve 16a is open). In this way, the subsea hydraulic power unit 24 actuates the hydraulic piston 12 to pressurise or depressurise the fluid in the working chamber 26 and hence in the service line 14.

Returning to FIG. 1, valve testing operations can be performed using the system 1 to test the operation of one or more of the valves 4a-4m in the subsea tree 2. The sequence of steps in the valve testing operation will vary depending on which valve or valves 4a-4m are being tested. Some example testing operations are described below with reference to FIGS. 3-5.

Figure 3:
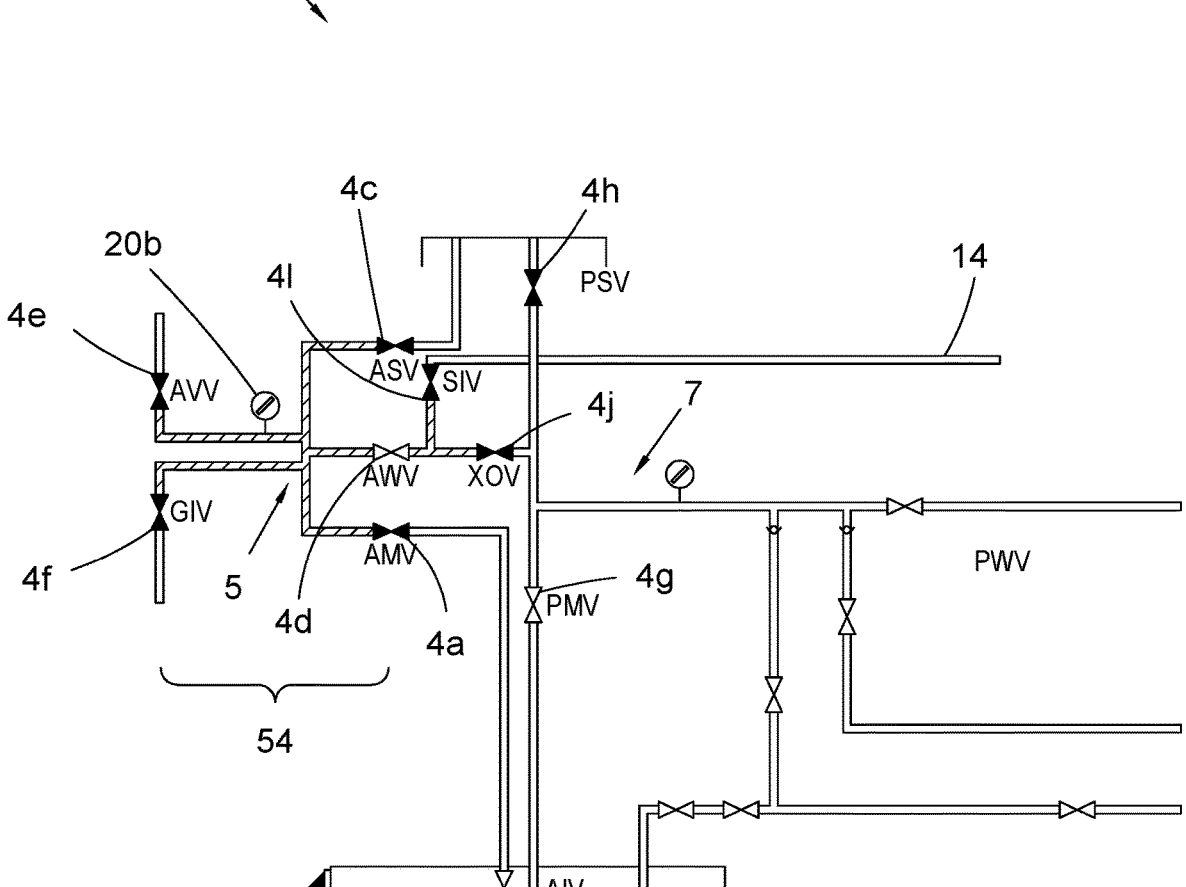
FIG. 3 shows the valve arrangement of the system of FIG. 1 in a first testing configuration.

With reference to FIG. 3, a first example valve test sequence is illustrated for testing the AMV 4a. The AMV 4a is tested at stable flow and temperature conditions and while the subsea well is producing.

In an initial configuration, the GIV 4f, AVV 4e, ASV 4c, AWV 4d, SIV 4l and XOV 4j are closed, and the AMV 4a is open. The upstream side of the AMV 4a is fluidly connected to the annulus 8, and thus the pressure directly upstream of the AMV 4a is at the pressure of the annulus 8.

The shut-in pressure in the annulus 8 is measured using the second pressure sensor 20b and recorded. The AMV 4a is then closed and the AWV 4d is opened. At this stage of the testing operation, the valve configuration of the subsea tree 2 is as shown in FIG. 3, with the open valves being represented with a hollow valve symbol and the closed valves being represented with a solid valve symbol. For simplicity, FIG. 3 shows only a portion of the system 1.

An isolatable region 54 of the subsea tree 2 is therefore defined by the valves GIV 4f, AVV 4e, ASV 4c, AMV 4a, SIV 4l and XOV 4j, and the isolatable region 54 is fluidly isolated by the closure of said valves 4a, 4c, 4e, 4f, 4j, 4l. The pressure in the isolatable region 54 directly after being fluidly isolated may be approximately the annulus pressure.

Next, the isolatable region 54 is depressurised according to the following steps. The service line valves 16a, 16b, 16c should be closed at this stage. The SIV 4l is opened such that fluid can flow from the isolatable region 54 into the service line 14 to bleed off pressure from (i.e. depressurise) the isolatable region 54. This begins to achieve a pressure differential across the AMV 4a. If the pressure differential at this point is less than a target pressure differential of 30-70 bar, then the hydraulic piston 12 is operated as follows.

Valve 16b is opened to vent pressure within the service line 14. The valve 16b is then closed when the pressure in the service line 14 and the pressure downstream of the PCV 4m are measured to be the same. The DCV 52 is set to the second position (i.e. so the driving cylinder 42 is isolated from the hydraulic power unit 24) and the required stop pressure (for the pressure measured by pressure sensor 20e) is set in control software for the pump 46.

The valve 16a is then opened and DCV 52 is set to the third position. This causes the hydraulic power unit 24 to withdraw fluid from the first driving chamber 32 and supply pressurised fluid into the second driving chamber 38, actuating the piston rod 28 to the right as described previously. The volume of the working chamber 26 thus increases, and fluid from the isolatable region 54 is sucked into the working chamber 26 via the service line 14, thereby depressurising the isolatable region 54.

When the stop pressure is reached, the valve 16a is closed and the DCV 52 is set in the second position again. The SIV 4l is closed.

The pressure in the isolatable region 54, as measured by pressure sensor 20b, is then monitored for 10 minutes, although other time periods may be used as set out in the relevant testing standards for the particular design of AMV 4a to be tested. The results are documented and the AMV 4a is determined to be operating correctly or incorrectly according to the results of the monitoring.

Once the valve test has been performed, the following procedure is conducted to prepare the subsea tree 2 for normal use again.

First it is ensured that the SIV 4l and the valves 16a, 16b, 16c are closed. The DCV 52 is initially set in the second position. The DCV 52 is switched to the first position and valves 16b and 16a are opened. This will cause high-pressure fluid from the high-pressure accumulator 50 to enter the first driving chamber 32, actuating the piston rod 28 to the left. Since valves 16a and 16b are open, the fluid will be reinjected into the production line 6a. When the piston rod 28 has reached an end position, the DCV 52 is set in its second position and the valve 16a is closed.

The valve 16c is then opened and fluid from the chemical storage system 18 is flushed through valve 16b for a short period of time. Valve 16b is then closed. If required, the service line 14 is flushed as well.

The system is now ready for normal use.

The above description is an example well test sequence for testing the operation of the AMV 4a using the present system and method. As mentioned above, the system and method can be used to test other valves of the subsea tree 2 as well.

Figure 4:
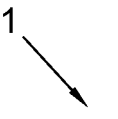
FIG. 4 shows the valve arrangement of the system of FIG. 1 in a second testing configuration.

Referring now to FIG. 4, a second well testing sequence can be performed on system 1 to test the PMV 4g. For simplicity, FIG. 4 shows only a portion of the system 1.

The PMV 4g is tested at stable flow and temperature conditions. The following procedure is for systems without gas lift. It is assumed that testing of the PMV 4g is conducted after the production cross 7 has been tested (the testing procedure for which is not described in detail here). Thus, chemical injection to the well is assumed to have been stopped, and the PCV 4m, PWV 4i, XOV 4j and PMV 4g are assumed closed. At this stage of the testing operation, the valve configuration of the subsea tree 2 is as shown in FIG. 4.

The AWV 4d is closed. It is ensured that valves 16a, 16b, 16c and SIV 4l are closed. A pressure for the pump in the chemical storage system 18 is set and the pump is started. Valve 16c is opened, followed by the SIV 4l. MEG or methanol stored in the chemical storage system 18 is injected through the service line 14 into the subsea tree 2 upstream of the XOV 4j, so that the pressure across the XOV 4j is equalized.

An isolatable region 56 of the subsea well is defined by the valves PSV 4h, PMV 4g, XOV 4j, PWV 4i, 10c and 10d (i.e. the production cross 7 is the isolatable region in this example). The isolatable region 56 is thus fluidly isolated by the closure of these valves 4g, 4h, 4i, 4j. The isolatable region 56 is then depressurised as follows.

The XOV 4j and SIV 4l are opened. Pressure in the isolatable region 56 is bled off via the XOV 4j through the service line 14. This continues until a pressure differential is formed across the PMV 4g. If the pressure differential at this point is less than a target pressure differential of 30-70 bar, then the hydraulic piston 12 is operated in the same manner as described in the first example testing sequence, to depressurise the isolatable region to below ambient pressure until the target pressure differential is reached.

The XOV 4j is then closed. The differential pressure across the XOV 4j is pressured up to 30 bar by injecting MEG or methanol from the chemical storage system 18 through the service line 14. The pressure in the isolatable region 56, as measured by pressure sensor 20a, is then monitored for 10 minutes. The results are documented and the PMV 4g is determined to be operating correctly or incorrectly according to the results of the monitoring.

Once the valve test has been performed, the isolatable region 56 is flushed with MEG or methanol to prepare the system 1 for normal use again, in a similar manner to that described in the first example testing sequence. The system 1 is now ready for normal use.

Figure 5:
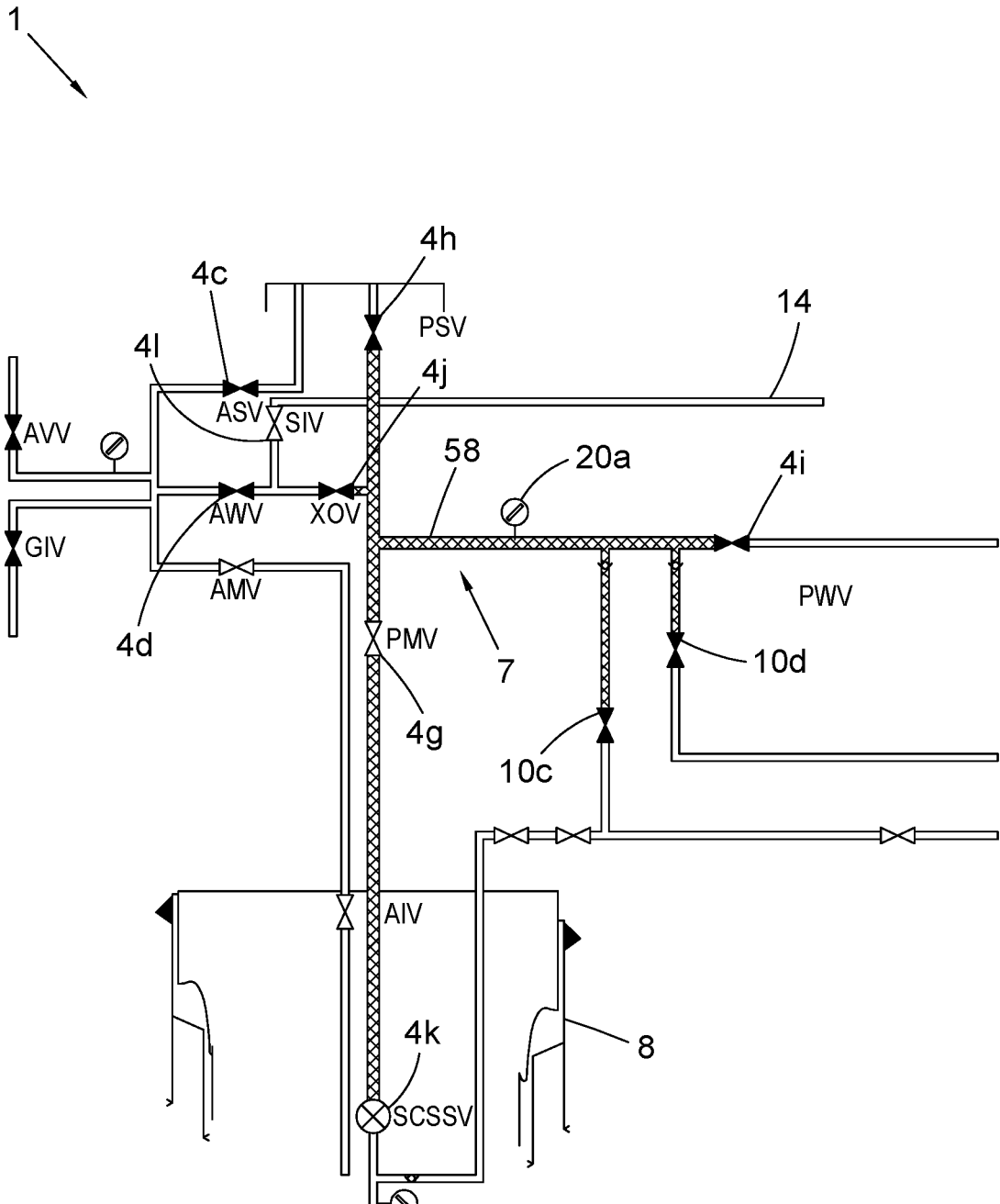
FIG. 5 shows the valve arrangement of the system of FIG. 1 in a third testing configuration.

A similar testing sequence can be performed to test the downhole safety valve (SCSSV) 4k. FIG. 5 shows the valve configuration during a testing operation for the SCSSV 4k. In this example, the isolatable region 58 is defined by valves XOV 4j, PSV 4h, PWV 4i, 10c, 10d and SCSSV 4k. The difference compared to the second testing sequence is that the PMV 4g is open and the SCSSV 4k is closed, such that the target pressure differential is created across the SCSSV 4k and the operation thereof is tested.

The system 1 and example testing sequences described above are for production wells. However, as discussed previously, the described testing method can also be applied to injection wells.

Figure 6:
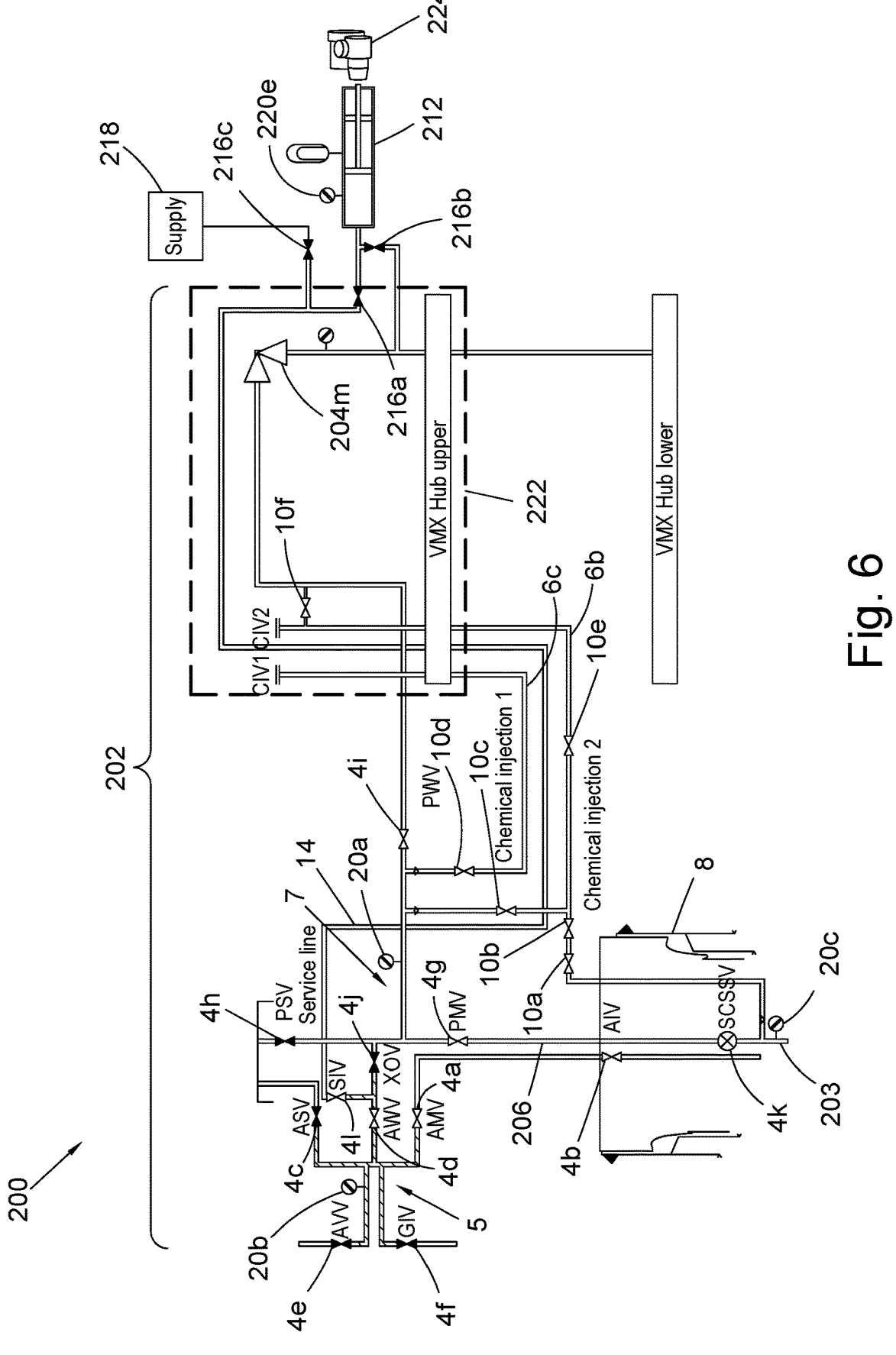
FIG. 6 shows a schematic diagram of a system according to a second embodiment.

FIG. 6 shows a system 200 according to a second embodiment. System 200 includes a subsea tree 2, the schematics of which are similar to subsea tree 2 in system 1. Thus, like reference numerals are used to indicate like elements. The difference between subsea tree 2 and subsea tree 202 is that in flow control module 222 of subsea tree 202, choke valve 204m is mounted the opposite way compared to the choke 4m of system 1, since the well associated with subsea tree 202 is an injection well rather than production well. The subsea tree 202 connects to an injection tubing 203, rather than a production tubing 3. Also, no multiphase flow meter (MPFM) is required in subsea tree 202, and the main pipeline is an injection line 206, rather than a production line 6a. A single phase meter such as a Venturi (not shown) may be used to verify the flow for single phase flow in the injection well.

In addition to the differences above, the pressure manipulation device used to depressurise isolatable regions of the subsea tree 202 is a piston 212 driven by an electric actuator 224, instead of a hydraulic piston 12 driven by a hydraulic power unit 24.

Figure 7:
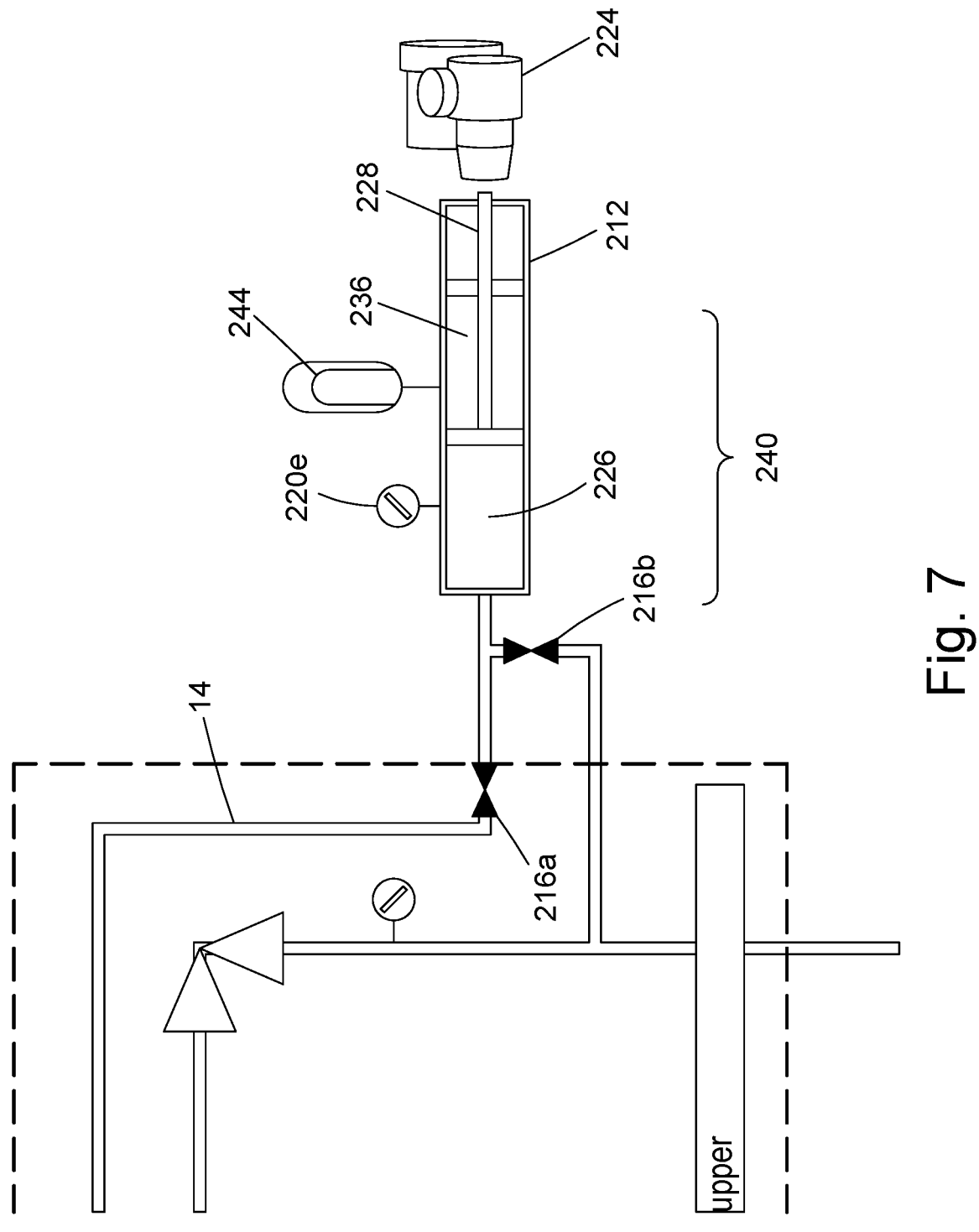
FIG. 7 shows a close view of the pressure manipulation device of the system of FIG. 6.

FIG. 7 shows a detailed view of the piston 212 and electric actuator 224 of system 200. The piston 212 includes a working chamber 226 fluidly connected to the service line 14 via a first service line valve 216a. The piston 212 further comprises a neutral chamber 236, with the working chamber 226 and the neutral chamber 236 together forming a working cylinder 240. The working chamber 226 comprises a pressure sensor 220e. Unlike the hydraulic piston 12 of system 1, no heater is required in the working chamber 226. This is because hydrate formation is not an issue with injection wells since the fluid is water/gas rather than hydrocarbons. The piston 212 includes a piston rod 228 arranged to adjust the volume of the working chamber 226 via linear motion of the piston rod 228.

The piston 212 comprises an accumulator 244 connected to the neutral chamber 236. Thus, as the piston rod 228 moves to the right, fluid in the neutral chamber 236 enters and is stored within the accumulator 244, and as the piston rod 228 moves to the left, fluid exits the accumulator 244 and enters the neutral chamber 236.

The piston rod 228 is driven by the electric actuator 224. The electric actuator 224 comprises a rotary element (not shown) configured to undergo rotational movement. The rotational movement of the rotary element is converted into linear movement of the piston rod 228 by a ball screw mechanism (not shown). Thus, the electric actuator 224 can vary the speed of the piston rod 228 and also cause the piston rod 228 to stop at an exact location to provide a very precise control of the bleed down pressure in the isolatable region.

The valve testing sequences for testing valves in the subsea tree 202 are similar to the sequences used for subsea tree 2, except for operation of the device used to manipulate the pressure of the isolatable region. An example testing sequence for testing the AMV 4a is described below.

The AMV 4a is tested at stable flow and temperature conditions.

Valve 216b is closed and valve 216a is opened. The shut-in pressure in the annulus 8 as measured by pressure sensor 20b is recorded. The AMV 4a is closed and the AWV 4d is opened. The isolatable region in this example is defined by the GIV 4f, the AVV 4e, the ASV 4c, the SIV 4l, the XOV 4j and the AMV 4a.

The isolatable region is then depressurised by opening the SIV 4l which creates a differential pressure across the AMV 4a. To depressurise the isolatable region further to below ambient pressure to achieve a target pressure differential of 30-70 bar across the AMV 4a, the electric actuator 224 is operated as follows.

The electric actuator 224 is operated to drive the piston rod 228 to the right to expand the volume of the working chamber 226. Fluid is then able to flow from the isolatable region to the working chamber 226 via the service line 14, thereby depressurising the isolatable region. The electric actuator 224 is stopped once the delta pressure of 30-70 bar across the AMV 4a is achieved. The SIV 4l is then closed.

The pressure in the isolatable region, as measured by pressure sensor 20b, is then monitored for 10 minutes. The results are documented and the AMV 4a is determined to be operating correctly or incorrectly according to the results of the monitoring.

After the valve test, valve 216a is closed and valve 216b is opened. The electric actuator 224 is operated to contract the volume of the working chamber 226. The actuator 224 stops when the piston rod 228 is in an end position. Thus, the fluid which entered the piston 212 during the valve test is reinjected into the injection line 206 afterwards.

The system 200 is then ready for normal operation or for further valve testing.

It will be readily appreciated that further testing sequences can be performed using system 200 to test other valves of the subsea tree 202 such as the PMV 4g and the SCSSV 4k, similarly to the testing sequences described with reference to system 1. Further testing sequences may use a different sequence of valve opening and closing to test other valves of the subsea tree 202, or to test multiple valves simultaneously, e.g. by testing the production cross 7 or the annular cross 5.

Although the above embodiments have been described in relation to depressurising the isolatable region, it will be appreciated that the pressure manipulation device could alternatively be used to pressurise the isolatable region to achieve the required valve testing pressure differential.

For instance, referring again to FIGS. 1-3, the following steps may be performed to pressurise (rather than depressurise, as described previously) the isolatable region 54.

The service line valves 16a, 16b, 16c should be closed initially. The SIV 4l is opened such that fluid can flow between the service line 14 and the isolatable region 54. The hydraulic piston 12 is then operated as follows.

Valve 16b is opened to equalise pressure within the service line 14. The valve 16b is then closed when the pressure in the service line 14 and the pressure downstream of the PCV 4m are measured to be the same. The DCV 52 is set to the second position (i.e. so the driving cylinder 42 is isolated from the hydraulic power unit 24) and the required stop pressure (for the pressure measured by pressure sensor 20e) is set in control software for the pump 46.

The valve 16a is then opened and DCV 52 is set to the first position. This causes the hydraulic power unit 24 to withdraw fluid from the second driving chamber 38 and supply pressurised fluid into the first driving chamber 32, actuating the piston rod 28 to the left. The volume of the working chamber 26 thus decreases, and fluid from the working chamber 26 is forced into the isolatable region 54 via the service line 14, thereby pressurising the isolatable region 54.

When the stop pressure is reached, the valve 16a is closed and the DCV 52 is set in the second position again. The SIV 4l is closed. The pressure monitoring can then be carried out as described previously to check the operation of the valve being tested.

If an electric actuator is used instead of a hydraulic actuator, e.g. as described previously with reference to FIGS. 6 and 7, then the isolatable region can be pressurised as follows. After the SIV 4l has been opened, the electric actuator 224 can be operated to drive the piston rod 228 to the left (rather than to the right, as described previously) to contract the volume of the working chamber 226. Fluid is then forced to flow from the working chamber 226 to the isolatable region via the service line 14, thereby pressurising the isolatable region.

If required, the position of the piston rod 28 or the piston rod 228 can be set prior to the start of the pressure manipulation process, depending on whether the isolatable region is to be pressurised or depressurised. For instance, if the isolatable region is to be depressurised, the piston rod 28, 228 can be initially set to the left before the valve 16a, 216a is opened. Conversely, if the isolatable region is to be pressurised, the piston rod 28, 228 can be initially set to the right before the valve 16a, 216a is opened. This gives the piston rod a greater range of motion for pressurising or depressurising the isolatable region.

The invention claimed is:

1. A method for testing a valve of a subsea tree, the subsea tree being arranged to control the flow of fluid into or out of a subsea well, the method comprising:

closing the valve to be tested;

fluidly isolating an isolatable region of the subsea tree directly adjacent to the valve to be tested;

after being isolated, depressurising the isolatable region to a pressure below an ambient, subsea pressure or pressurising the isolatable region using a pressure manipulation device positioned subsea;

monitoring a pressure of the isolatable region after being depressurised or pressurised; and determining whether the valve to be tested is operating correctly based on the monitoring.

2. A method as claimed in claim 1, wherein depressurising or pressurising the isolatable region comprises expanding or contracting a controllable volume of the pressure manipulation device, the controllable volume being in fluid communication with the isolatable region.

3. A method as claimed in claim 1, wherein the pressure manipulation device comprises a piston.

4. A method as claimed in claim 1, comprising driving the pressure manipulation device using a subsea hydraulic power unit or a subsea electric actuator.

5. A method as claimed in claim 1, wherein the subsea well comprises a hydrocarbon production well, a liquid injection well or a gas injection well.

6. A method as claimed in claim 1, wherein an upstream side of the valve to be tested is fluidly connected to an annulus of the subsea well such that a pressure directly upstream of the valve to be tested during the testing operation is at a pressure of the annulus.

7. A method as claimed in claim 1, wherein the isolatable region is depressurised or pressurised to a pressure such that a pressure differential across the valve to be tested is within the range of 30 to 70 bar.

8. A method as claimed in claim 1, wherein the valve to be tested is determined to be not operating correctly if the pressure of the isolatable region after being depressurised increases at a rate above a predetermined threshold, or if the pressure of the isolatable region after being pressurised decreases at a rate above a predetermined threshold.

9. A system, comprising:
   a subsea tree for controlling the flow of fluid into or out of a subsea well, the subsea tree comprising a valve to be tested, wherein the system is configured such that an isolatable region of the subsea tree directly adjacent to the valve to be tested can be fluidly isolated during a valve testing operation;
   a pressure manipulation device positioned subsea and connected to the subsea tree such that the pressure manipulation device can depressurise fluid within the isolatable region to a pressure below an ambient, subsea pressure or pressurise fluid within the isolatable region during a valve testing operation; and
   a sensing device arranged to measure a pressure of the isolatable region for determining correct operation of the valve to be tested.

10. A system as claimed in claim 9, wherein the pressure manipulation device comprises a controllable volume in fluid communication with the isolatable region and is configured to depressurise the isolatable region by expanding the controllable volume or to pressurise the isolatable region by contracting the controllable volume.

11. A system as claimed in claim 9, wherein the pressure manipulation device comprises a piston.

12. A system as claimed in claim 9, comprising a subsea hydraulic power unit or a subsea electric actuator configured to drive the pressure manipulation device.

13. A system as claimed in claim 9, wherein the subsea well comprises a hydrocarbon production well, a liquid injection well or a gas injection well.

14. A system as claimed in claim 9, wherein the upstream side of the valve to be tested is connected to an annulus of the subsea well such that a pressure directly upstream of the valve to be tested during the valve testing operation is a pressure of the annulus.

15. A system as claimed in claim 9, wherein the subsea tree comprises a plurality of valves including the valve to be tested, and wherein the plurality of valves fluidly isolate the isolatable region of the subsea tree when closed.

16. A system as claimed in claim 9, wherein the pressure manipulation device is configured to depressurise or pressurise the isolatable region such that a pressure differential across the valve to be tested is within the range of 30 to 70 bar.

\* \* \* \* \*